United States Patent

[11] 3,586,051

[72] Inventors Gordon Richard Walker;
William Murray, both of Leamington Spa, England
[21] Appl. No. 820,549
[22] Filed Apr. 30, 1969
Continuation-in-part of Ser. No. 638,334, May 15, 1967, Pat. No. 3,570,536.
[45] Patented June 22, 1971
[73] Assignee Filton Limited
Leamington Spa, England

[54] ROTARY UNION
6 Claims, 3 Drawing Figs.
[52] U.S. Cl. .................................................. 137/625.11, 137/580
[51] Int. Cl. ..................................................... F16k 11/00, F16l 27/00
[50] Field of Search .......................................... 137/625.11, 580; 251/180

[56] References Cited
UNITED STATES PATENTS
2,750,933 6/1956 Lauck .......................... 137/625.11 X
2,869,526 1/1959 Dolza .......................... 137/625.11 X
3,079,948 3/1963 Allen........................... 137/625.11 X Primary Examiner—William R. Cline
Attorney—Cushman, Darby & Cushman ABSTRACT: A rotary union having a hollow shaft rotatably mounted within a casing, an inlet port to the casing, means for sealing the shaft to the casing while permitting fluid passage between the port and the interior of the hollow shaft, the union being adapted to distribute fluid sequentially from the hollow shaft through a first ported, coaxial disc valve member and a second coaxial member having passages which register with the port or ports of the disc valve member, a separate disc or plate is fixed to the end of the second coaxial member and has ports which register with the passages in the second coaxial member, either the first or second coaxial members is rotatable with the shaft relative to the other member so that on rotation the ports in the members register sequentially to permit fluid to flow from the interior of the shaft axially through the ports in the first disc valve member and into the passages of the second coaxial member, whereby the separate disc or plate which is fixed to the second coaxial member can be quickly changed so that to allow selections of various sized and shaped ports for the second coaxial member.

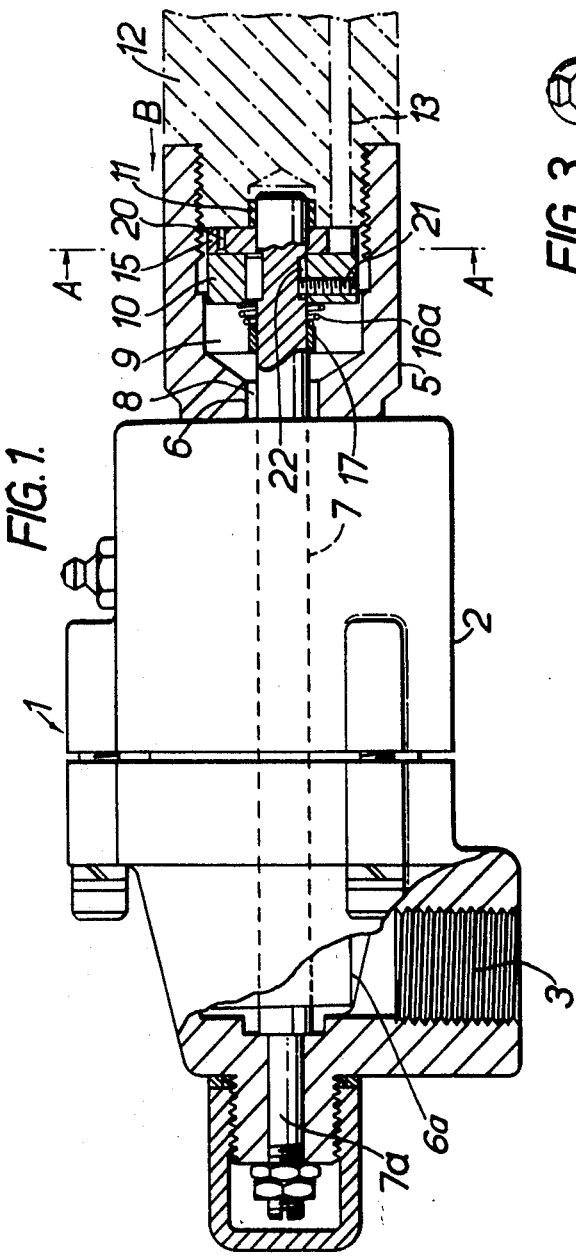
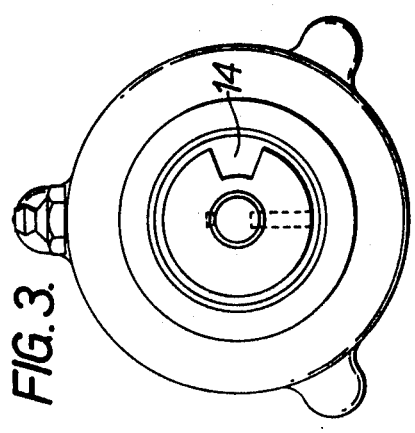
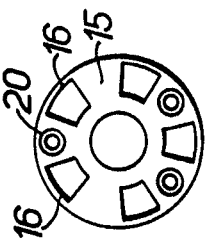
PATENTED JUN 22 1971  3,586,051
FIG.1.
FIG.2.
FIG.3.
Inventors
Gordon Richard Walker
William Murray
By Cushman, Darby & Cushman
Attorneys

ROTARY UNION

This is a continuation-in-part of application Ser. No. 638,334, filed May 15, 1967, now U.S. Pat. No. 3,570,536.

The present invention relates to rotary unions, and more specifically to unions as described in the above-mentioned application Ser. No. 638,334, comprising a hollow shaft rotatable within a casing wherein the casing is provided with an inlet port and means within the casing for sealing the shaft with respect to the casing while permitting fluid passage between said port and the interior of the hollow shaft.

In the above-mentioned, copending application there is described and claimed a rotary union and distributor which permits fluid to be sequentially distributed to several different outlets. The union comprises a hollow shaft rotatably situated within a casing. The casing is provided with an inlet port and means within the said casing for sealing the shaft with respect to the casing while permitting fluid passage between said port and the interior of the hollow shaft. A port disc valve member and a coaxial multiported member cooperate with each other, with one of said members being rotatable with the shaft relatively to the other member. The port disc valve and multiported members being arranged with respect to the shaft and casing so that fluid will flow axially from the interior of the shaft through the ports in the cooperating ported members while the faces of the ported members are maintained in sealing relation.

In the present invention the coaxial ported member comprises a shaft or similar member provided with one or more offcenter passages and a separate, ported disc or plate member whose ports register with the passage or passages in the shaft member. The ported disc or plate member is removably fixed to the end of the shaft member. The coaxial, ported shaft member, with the integrally attached disc or plate member is rotatable relative to the disc valve member and is maintained in face-sealing relationship with the disc valve member.

The disc valve member may be slidably keyed to an internal shaft, e.g., a shaft fixed in relation to the casing and arranged in the hollow shaft. A pin, screw or the like through the disc valve member cooperates with a groove in the internal shaft axially to retain the disc valve member on the internal shaft during assembly.

The present invention will be further described hereinafter with reference to the accompanying drawings, in which:

FIG. 1 is a partial cross-sectional view of a rotary union according to the present invention.

FIG. 2 is a cross-sectional end view taken on the line A-A of FIG. 1.

FIG. 3 is an end view looking in the direction of the arrow B, FIG. 1, with the cooperating rotatable ported member which cooperates with the fixed valve disc removed.

Referring now to the drawings the rotary union 1 is provided with a casing 2, and a fluid inlet 3. The casing rotatable supports, e.g., by means of suitable ball and or roller bearings one part 5, of a rotatable shaft which is provided with an axial bore 6. A rotary contact seal 6a is provided between the shaft and the casing.

An internal, nonrotatable shaft 7 passes through bore 6 and is secured to the casing 2 at the left-hand end as shown at 7a in FIG. 1. The shaft 7 is so proportioned in relation to the bore 6 that an annular passage 8 is formed around the shaft 7. Passage 8 is in communication with the interior of the casing 2 and the inlet 3. Passage 8 expands into a chamber 9 containing a disc valve 10 which is detachably keyed to the fixed shaft 7 so as to be nonrotatable in relation thereto. The end of the fixed shaft 7 supports, by way of a sleeve bearing 11, rotatable shaft 12 which is attached to the end of the shaft 5. Shaft 12 is provided with a number of offcenter longitudinal passages 13 each of which direct the fluid to an operating zone. The disc valve 10 is formed with a port 14 shown in FIG. 3 formed by a notch in the periphery of the disc valve 10. The part 14 has radial edges.

The passages 13 in the shaft part 12 may be circular in cross section. Passage 13 cooperate with the valve disc 10 through the disc or plate 15, which is provided with a plurality of ports 16. The ports 16 have radial edges or edges of other suitable form to register with passages 13 and to control the opening and closing rates during operation. The disc or plate 15 is fixed to the end of shaft 12.

The disc valve 10 is slidably mounted on shaft 7 and is pressed by spring 16a against a seat formed by the disc or plate 15. The spring 16a bears at its outer end against a split ring or collar 17 secured to the shaft 7. The disc or plate 15 may be secured to shaft port 12 by a number of screws 20 the heads of which are countersunk into the disc or plate below its contacting face. The cooperating radial-edged port 14 of the disc valve and ports 16 in disc or plate 15 promote rapid opening and closing of communication from the disc valve port 14 to the passages 13 in the shaft member 12. The disc or plate 15 may be readily affixed or removed. It may be of a material different from the shaft part 12 and appropriate for forming a smooth hard seal face for cooperation with the opposed likewise smooth hard seal face of the disc valve 10. It enable ports of a desired shape different from the simple cylindrical bores in the shaft to be provided, e.g., the radial-edged ports as shown.

As the shaft formed from shaft ports 5 and 12 rotates, passages 13 of shaft port 12 and the associated port in disc or plate 15 will successively come into registration with the port or ports 14 in the disc valve member 10 and will remain in registration therewith for a period dependent upon the circumferential length of the port and the relative speed of rotation.

The fluid may flow from the passages e.g., by way of radial extension of the passages to outlets to the appropriate operating zones, which may be cylinders for pneumatic or hydraulic operation of any part controlled by the cylinders e.g., as described in the above-mentioned application Ser. No. 638,334.

The disc valve 10 is slidably keyed to the fixed shaft 7 pushing the valve disc out of keyway engagement with the shaft 7 during assembly, a screw 21 is threaded through the valve disc member 10 into engagement with a groove 22 in the shaft 7 to act as a stop. The disc valve member 10 may be removed by unscrewing the screw 21 clear of the groove 22 after removing the shaft 7 completely from the rotary union.

We claim:

1. A rotary union adapted to distribute fluid sequentially to different outlets, the union comprising a casing and a hollow shaft rotatable within and extending from said casing, said casing having an inlet port, means within said casing for sealing the shaft with respect to said casing while permitting fluid passage between said inlet port and the interior of the hollow shaft, a shaft extension having offcenter, longitudinal passages intersecting an end face, said shaft extension being releasably attached coaxially with said hollow shaft on the end of said hollow shaft which extends from said casing, such that said end face passages communicate with the hollow interior, a first disc valve member being coaxial with the hollow shaft and having at least one port defining a fluid outlet from said hollow shaft, a second disc valve member coaxial with said hollow shaft and having fluid outlet ports, registering with said passages, said second disc valve member being fixed to the end face of said shaft extension, the second disc valve member being continuously rotatable with said hollow shaft relative to the first disc valve member, said first and second disc valve members being arranged so that on rotation of said hollow shaft the fluid outlet ports of the second disc valve member are successively registerable with the fluid outlet port or ports of the first disc valve member, means for maintaining adjacent faces of the first and second disc valve members in sealing relation with each other, means for maintaining adjacent faces of the second disc valve member and the shaft extension in sealing relation with each other, whereby on rotation of said hollow shaft fluid flows from the interior of the shaft axially through the port or ports in the first disc-valve member and sequentially into the longitudinal passages of the shaft extension by way of the ports in said second disc valve member.

2. A rotary union according to claim 1 having an internal shaft arranged within said hollow shaft, said internal shaft being nonrotatably fixed to the casing, and securing means passing radially through a passage in the first disc valve member and cooperating with a groove in the internal shaft to axially retain the disc valve member on the internal shaft during assembly.

3. A rotary union according to claim 1, in which the first disc valve member has at least one port with radial edges.

4. A rotary union according to claim 3 in which the second disc valve member has ports with radial edges.

5. A rotary union according to claim 1 having an internal shaft arranged within the hollow shaft and which is nonrotatably fixed in relation to the casing, said first disc valve member being nonrotatably fixed on the said internal shaft and the said second disc-valve member being detachably connected to said shaft extension.

6. A rotary union according to claim 5, in which the disc valve member is mounted on said internal shaft for axial movement thereon and is pressed by spring means into face contact with the said second disc valve member.